3,361,669
PROCESS FOR LUBRICATING DIESEL ENGINES HAVING DUAL LUBRICATING SYSTEMS
Hendrik A. van Westen, The Hague, and Martinus J. van der Zijden and Johannes W. A. Schrakamp, Amsterdam, Netherlands, assignors to Shell Oil Company, New York, N.Y., a corporation of Delaware
No Drawing. Filed Apr. 27, 1965, Ser. No. 451,332
Claims priority, application Netherlands, Apr. 29, 1964, 64—4,814
5 Claims. (Cl. 252—40.7)

The invention relates to a lubricating oil composition for cylinder lubrication of engines with separate cylinder and crankshaft lubrication, containing a lubricating oil and lubricating oil additives.

The lubrication of cylinders and pistons of engines with separate lubrication of cylinders and crankshaft involves problems which are not encountered with lubrication of cylinder and piston from the crankcase. These problems are mainly due to the lubricating system used for engines with separate lubrication of cylinders and crankshaft: the lubricating oil destined for the lubrication of cylinder and piston is forced between the piston and the cylinder through one or several holes in the cylinder wall and is then lost, for instance, through combustion via the exhaust or through leakage along the piston. With this "once-through" lubrication the lubricating oil dosage is chosen as low as possible in order to limit the consumption of lubricating oil as much as possible. This leads to problems which are unknown in the other types of engines in which the lubricating oil covers the cylinder wall in relative abundance and circulates continuously between piston and crankcase: the oil must, in quantities just sufficient for the lubrication of cylinder and piston, keep the cylinder wall and the piston wall, and also the piston rings, clean and protect them against corrosion by acids formed upon combustion of the fuel, and it must do this while being lost for a large part through combustion.

The problems are further due to the fact that these engines, which are generally used for the propulsion of ships and are built for high power outputs, are operated on cheap fuels which have a high sulphur content and leave a considerable amount of residue upon combustion.

A solution for these problems has already been found by applying water-in-oil emulsions containing salts—for instance, calcium acetate—dissolved in the aqueous phase and stabilized by emulsifiers. In addition, lubricants are known which do not consist of emulsions, but only of an oil and salts or hydroxides dispersed in it. The performance of such lubricants is considered insufficient, also in view of the ever-increasing dimensions and pressures in engines, particularly as far as the anti-wear performance is concerned.

It has now been found that these objections can be obviated by using a lubricating oil composition which, in addition to a lubricating oil or a mixture of lubricating oils and a dispersed salt and/or hydroxide of an alkaline earth metal, also contains one or more oil soluble polymers without polar groups and which have been prepared by polymerization of olefinically unsaturated compounds.

The invention therefore relates to a lubricating oil composition for the cylinder lubrication of engines with separate cylinder and crankshaft lubrication, which, in addition to a lubricating oil or a mixture of lubricating oils and a dispersed salt and/or hydroxide of an alkaline earth metal also contains one or more oil-soluble polymers without polar groups and which have been prepared by polymerization of olefinically unsaturated compounds.

Polymers without polar groups should be understood to be polymers in which no carboxyl groups, carboxylic anhydride groups, hydroxyl groups, epoxy groups and nitrogen-containing groups occur.

The polymers according to the invention have in general few if any polar properties. Polymers containing groups with a low polarity, such as ester and ether groups, are for the purpose of the present invention regarded as polymers without polar groups.

The term of polymers, as used in the specification and claims of this patent application, relates to homopolymers as well as to copolymers.

The combination of the dispersed salt or hydroxide and the oil-soluble polymer imparts to the lubricating oil composition anti-wear properties which are considerably better than those which may be expected on the basis of the combined effect of the two components. This synergistic effect is all the more remarkable because oil-soluble polymers of the present type are as such in general incapable of imparting anti-wear properties to an oil.

The lubricating oils which are present as base oil in the lubricating oil compositions according to the invention may have been derived, for example, from aromatic, naphthenic or paraffinic crude oils. They may be distillate lubricating oils as well as residual lubricating oils. They may also be mixtures of distillate lubricating oils and residual lubricating oils. Preference is given to lubricating oil compositions in which the base oil consists either completely or to an extent of 90% or more of a distillate lubricating oil or mixture of distillate lubricating oils.

The boiling range of the lubricating oils, calculated on atmospheric pressure, is as a rule between 350 and 550° C.

The viscosity index of these oils varies, dependent on the type of oil and the refining technique applied, from 0 to 120. As is known, distillate lubricating oils of the aromatic and naphthenic types usually have a lower viscosity index than distillate lubricating oils of the paraffinic type. In general lightly refined lubricating oil distillates with a viscosity index of 30 or higher are preferred, for instance, a naphthenic oil distillate extracted with liquid sulphur dioxide and after-treated with earth.

The concentration of the dispersed salt or hydroxide in the lubricating oil composition may be varied within wide limits and be adapted to the degree of wear that must be controlled. By way of example may be mentioned concentrations of from 0.01 to 0.5 equivalent of alkaline earth metal per 100 grams of lubricating oil composition. If so desired, higher or lower concentrations may also be present.

By alkaline earth metals are understood the metals magnesium, calcium, strontium and barium. Their hydroxides or salts may be dispersed in an oil in any suitable manner. For instance, the hydroxides or the salts may be finely divided in a mineral oil with the aid of a colloid mill. Another suitable method starts from a solution of the salt or the hydroxide in a solvent which is mixed or emulsified with oil, if desired with the aid of an emulsifier, after which the solvent is removed from the resulting composition by evaporation or distillation, leaving a dispersion of the salt or the hydroxide in the oil. Such methods are described in British Patents 778,468 and 791,413. Preference is given, however, to a preparation in which the salt or the hydroxide is formed in situ in the presence of a stabilizer. Suitable methods have been described, for instance, in British Patents 739,434, 780,058, 786,167, 790,471, 793,608, 795,172, 818,323, and 818,326.

Both an inorganic and an organic salt of an alkaline earth metal may be applied. Of the organic salts, those of aliphatic carboxylic acids are preferred.

Of the inorganic salts of the alkaline earth metals the carbonates are very suitable, as they are very easy to obtain in the form of stable dispersions in oil. Examples of the preparation of dispersions of carbonates have been mentioned in British Patents 786,167, 790,471, 793,608 and 795,172.

In applying a stabilizer in preparing the dispersions in oil of salts or hydroxides of alkaline earth metals the quantity usual in technical practice may be used. It varies, of course, with the type of stabilizer applied.

In applying salts of organic acids as stabilizers the quanity used may be expressed as a certain amount of equivalents per equivalent of dispersed salt or hydroxide. As an example of a quantity of stabilizer expressed by this measure may be mentioned a quanity of 0.1 equivalent of stabilizer per equivalent of dispersed salt or hydroxide. In general a quantity as small as 0.05 equivalent of stabilizer per equivalent of dispersed salt or hydroxide suffices; a quantity larger than 0.5 equivalent of stabilizer per equivalent of dispersed salt or hydroxide is seldom required.

Examples of salts of organic acids that may be present as stabilizers are the alkaline earth metal salts of aliphatic and aromatic carboxylic acids and hydroxycarboxylic acids and the alkaline earth metal salts of aliphatic and aromatic sulphonic acids. Preference is given to alkaline earth metal salts of the aliphatic carboxylic acids obtained in the oil industry as mixtures in the refining of oil fractions and called naphthenic acids, although the salts of sulphonic acids, for instance, sulphonic acids prepared of sulphonation of aromatic oil fractions, and the salts of alkylsalicylic acids are also very suitable to be applied as stabilizers.

The concentration of the dispersion of the salt or hydroxide of the alkaline earth metal in the composition according to the invention may vary within wide limits, as already elucidated. Preferably, however, first a concentrated dispersion of the salt or hydroxide in an oil is prepared, the concentrate obtained then being used for preparing the composition according to the invention. Concentrates containing 10–25% w. salt or hydroxide in dispersed form are very suitable.

The oil in which the salts or hydroxides are dispersed in the preparation of a concentrate may be a residual as well as a distillate lubricating oil. Preferably the concentrate is prepared in a distillate lubricating oil. If the base oil for the lubricating oil composition is a distillate lubricating oil or a mixture of distillate lubricating oils, the distillate lubricating oil in which the concentrate is prepared need not be the same and may, for instance, have a lower viscosity.

The oil-soluble polymers in which no polar groups occur and which have been prepared by copolymerization of olefinically unsaturated compounds, are partly known already as lubricating oil additives. For, some of these polymers are capable of increasing the viscosity and/or reducing the pour point of lubricating oils.

The preparation of the oil-soluble polymers which do not contain polar groups as meant in the present application can in principle be effected in three ways. In the first place these polymers can be prepared by direct polymerization of olefinically unsaturated compounds which do not contain polar groups.

In the second place, these polymers can be prepared by polymerization of olefinically unsaturated compounds part of which at least contains polar groups, and after-treatment of the polymer to eliminate the polar properties of these groups entirely or substantially.

Finally, a polymer obtained by polymerization of olefinically unsaturated compounds which do not contain polar groups may be subjected to an after-treatment in order to modify certain properties of the polymer without groups with polar properties being introduced into the polymer.

As examples of olefinically unsaturated monomers which may be used as starting material for the preparation of polymers according to the invention may be mentioned vinyl esters of saturated monocarboxylic acids, such as vinyl palmitate and vinyl stearate; allyl esters of saturated monocarboxylic acids, such as allyl laurate and allyl myristate; alkyl esters of unsaturated monocarboxylic acids, such as lauryl acrylate and stearyl methacrylate; dialkyl esters of unsaturated dicarboxylic acids, such as dilauryl fumarate and distearyl maleate; alkylvinyl ethers, such as laurylvinyl ether and stearylvinyl ether; monoolefins such as isobutene and styrene; diolefins such as butadiene and isoprene; alkylallyl carbonate esters such as ($C_8$–$C_{18}$) alkylallyl carbonate esters.

As examples of oil-soluble polymers obtained by direct polymerization of olefinically unsaturated compounds which do not contain polar groups as meant in the present application may be mentioned:

Homopolymers of vinyl esters of saturated monocarboxylic acids.

Copolymers of vinyl esters of saturated monocarboxylic acids mutually.

Copolymers of vinyl esters of saturated monocarboxylic acids with allyl esters of saturated monocarboxylic acids, alkyl esters of unsaturated monocarboxylic acids, dialkyl esters of unsaturated dicarboxylic acids, alkylvinyl ethers, olefins or allyl carbonate esters.

Homopolymers of allyl esters of saturated monocarboxylic acids.

Copolymers of allyl esters of saturated monocarboxylic acids mutually.

Copolymers of allyl esters of saturated monocarboxylic acids with alkyl esters of unsaturated monocarboxylic acids or dialkyl esters of unsaturated dicarboxylic acids.

Homopolymers of alkyl esters of unsaturated monocarboxylic acids.

Copolymers of alkyl esters of unsaturated monocarboxylic acids mutually.

Copolymers of alkyl esters of unsaturated monocarboxylic acids with dialkyl esters of unsaturated dicarboxylic acids, alkylvinyl ethers or olefins.

Homopolymers of dialkyl esters of unsaturated dicarboxylic acids.

Copolymers of dialkyl esters of unsaturated dicarboxylic acids mutually.

Copolymers of dialkyl esters of unsaturated dicarboxylic acids with alkylvinyl ethers or olefins.

Homopolymers of alkylvinyl ethers.

Copolymers of alkylvinyl ethers mutually.

Copolymers of alkylvinyl ethers with alkoxyvinyl ethers or olefins.

Homopolymers of monoolefins.

Copolymers of mono-olefins mutually.

Copolymers of mono-olefins with diolefins.

Homopolymers of diolefins.

Copolymers of diolefins mutually

Homopolymers of alkylallyl carbonate esters.

Copolymers of alkylallyl carbonate esters mutually.

If the oil-soluble polymers are copolymers, they may have been built up from two as well as from more than two different monomers. As examples of terpolymers may be mentioned a terpolymer obtained by copolymerization of a vinyl ester of a saturated mono-carboxylic acid with an alkyl ester of an unsaturated monocarboxylic acid and a dialkyl ester of an unsaturated dicarboxylic acid, and a terpolymer obtained by copolymerization of a vinyl ester of a saturated monocarboxylic acid with a dialkyl ester of an unsaturated dicarboxylic acid and a mono-olefin.

As examples of oil-soluble polymers obtained by polymerization of olefinically unsaturated compounds part of which at least contains polar groups, which polymers have been subjected to an after-treatment through which the polar properties of these groups have been eliminated either completely or substantially, the following may be mentioned.

Copolymers of unsaturated monocarboxylic acids, dicarboxylic acids or anhydrides thereof with mono-olefins, vinyl esters of saturated monocarboxylic acids, allyl esters of saturated monocarboxylic acids, alkylvinyl ethers or dialkyl esters of unsaturated dicarboxylic acids. The after-treatment takes place by an esterification with an aliphatic alcohol, in which the polar carboxyl groups or carboxylic anhydride groups are converted into non-polar ester groups.

Homopolymers of olefinically unsaturated compounds which contain a hydroxyl group are after-treated with an aliphatic acid chloride, in which the polar hydroxyl groups are converted into non-polar ester groups.

As examples of oil-soluble polymers obtained by polymerization of olefinically unsaturated compounds, which polymers have been subjected to an after-treatment without groups with polar properties being introduced into the molecule, the following may be mentioned.

Homopolymers of vinyl aromatic compounds or copolymers of vinyl aromatic compounds with mono- or diolefins, which homopolymers and copolymers, respectively, are alkylated and/or acylated, for example with an alkyl chloride and a carboxylic acid chloride, respectively.

Homopolymers of unsaturated aldehydes and alkylvinyl ketones, which homopolymers are after-treated with an aliphatic alcohol, through which the carbonyl groups are converted into acetal groups.

In general the lubricating oil composition contains only one oil-soluble polymer. However, also two or more oil-soluble polymers may occur.

Although the present lubricating oil composition may in general contain oil-soluble polymers which do not contain polar groups and which have been prepared by polymerization of olefinically unsaturated compounds, preference is given to lubricaitng oil compositions in which one or more of the following polymers occur.

Homopolymers and copolymers of mono- and diolefins, which mono- and diolefins contain 10 carbon atoms or less.

Homopolymers of mono-olefins, in particular a homopolymer of isobutene. Very suitable are polyisobutenes with a molecular weight of 500–30,000.

Copolymers of mono-olefins mutually, in particular a copolymer of ethene and propene.

Homopolymers of diolefins, in particular a homopolymer of butadiene and a homopolymer of isoprene.

Copolymers of mono-olefins with diolefins, in particular a copolymer of isobutene with isoprene.

Copolymers of alkyl esters of unsaturated monocarboxylic acids mutually, in particular a copolymer prepared from a mixture of alkyl methacrylates with 4–18 carbon atoms in the alkyl group.

Copolymers of vinyl esters of saturated monocarboxylic acids mutually, in particular a copolymer prepared from a mixture of vinyl esters of monocarboxylic acids branched in the alpha-position, with 9–19 carbon atoms in the molecule.

The concentration in which the oil-soluble polymers occur in the lubricating oil composition may vary within wide limits, dependent on the nature, the structure and the molecular weight of the polymer and the anti-wear effect to be achieved. In some cases a quantity of 0.1% w. calculated on the lubricating oil composition is already sufficient to achieve the synergistic anti-wear effect. In most cases a quantity of 10% w. is amply sufficient. Higher and lower concentrations than those mentioned above are also possible in some cases.

The oil-soluble polymers are components of the lubricating oil composition. However, they need not have lubricating oil properties themselves and their viscosity therefore need not lie in the viscosity range customary for lubricating oils. Hence, the oil-soluble polymers may be of varying viscosity and therefore of varying molecular weight.

Very good compositions according to the invention contain a distillate lubricating oil refined with liquid sulphur dioxide and after-treated with earth, having a viscosity index of from 30 to 60 and a viscosity at 50° C. of from 60 to 75 cs., a concentrated dispersion of calcium carbonate stabilized by calcium naphthenate in a quantity of from 0.08 to 0.12 equivalent of calcium naphthenate per equivalent of dispersed calcium carbonate in a mineral oil with a viscosity of 7.0–21 cs. at 50° C., and homo- or copolymers of mono- or diolefins.

The invention will now be elucidated with the aid of the following examples.

EXAMPLE I

| | Percent w. |
|---|---|
| Base oil (naphthenic distillate lubricating oil with a viscosity index of 45, a viscosity at 50° C. of 68 cs. and at 98.9° C. of 10.2 cs.) | 58 |
| Polyisobutylene mol. wt. Mn 1050 | 8 |
| Concentrate in distillate lubricating oil of dispersed calcium carbonate stabilized by 0.10 equivalents of calcium naphthenate; Ca content 7.35% w. | 34 |

EXAMPLE II

| | |
|---|---|
| Base oil of Example I | 56 |
| Polyisobutylene mol. wt. Mn 830 | 10 |
| Concentrate of dispersed calcium carbonate of Example I | 34 |

EXAMPLE III

| | |
|---|---|
| Base oil of Example I | 64.5 |
| Polyisobutylene mol. wt. Mn 15,000 | 1.5 |
| Concentrate of dispersed calcium carbonate of Example I | 34 |

EXAMPLE IV

| | |
|---|---|
| Base oil of Example I | 73.7 |
| Polyisobutylene mol. wt. Mn 15,000 | 1.5 |
| Concentrate in distillate lubricating oil of dispersed calcium carbonate stabilized by 0.12 equivalents of calcium $C_{14}$–$C_{18}$ alkyl salicylate; Ca content 10.1% w. | 24.8 |

EXAMPLE V

| | |
|---|---|
| Base oil of Example I | 65.2 |
| Copolymer prepared from a mixture of alkyl methacrylates with 4–18 carbon atoms in the alkyl group. Average molecular weight 600,000 | 0.8 |
| Concentrate of dispersed calcium carbonate of Example I | 34.0 |

EXAMPLE VI

| | |
|---|---|
| Base oil of Example I | 63.3 |
| Copolymer prepared from a mixture of vinyl esters of monocarboxylic acids branched in the alpha-position, with 9–19 carbon atoms in the molecule. Molecular weight 300,000–600,000 | 2.7 |
| Concentrate of dispersed calcium carbonate of Example I | 34.0 |

EXAMPLE VII

| | |
|---|---|
| Base oil of Example I | 65.70 |
| Polyisoprene with cis-1,4 content higher than 90%. Average molecular weight 400,000, obtained by cold rolling for 30 minutes of a polymer with a molecular weight of 2,000,000 | 0.30 |
| Concentrate of dispersed calcium carbonate of Example I | 34.00 |

EXAMPLE VIII

| | |
|---|---|
| Base oil of Example I | 65.64 |
| Polybutadiene (average molecular weight 275,000) | 0.36 |
| Concentrate of dispersed calcium carbonate of Example I | 34.00 |

EXAMPLE IX

| | |
|---|---:|
| Base oil of Example I | 65.72 |
| Copolymer of isobutene and isoprene, containing 0.7% M of isoprene. Mooney viscosity 60 ml. 1+4 at 100° C. (determined acc. to ASTM-D 1646-63) | 0.28 |
| Concentrate of dispersed calcium carbonate of Example I | 34.00 |

EXAMPLE X

| | |
|---|---:|
| Base oil of Example I | 65.66 |
| Copolymer of isobutene and isoprene, containing 2.2% M of isoprene. Mooney viscosity 75 ml. 1+4 at 100° C. (determined acc. to ASTM-D 1646-63) | 0.34 |
| Concentrate of dispersed calcium carbonate of Example I | 34.00 |

EXAMPLE XI

| | |
|---|---:|
| Base oil of Example I | 65.76 |
| Copolymer of ethylene and propylene, containing 60% M of ethylene and 40% M of propylene. Intrinsic viscosity 2.2 at 135° C. in Decalin | 0.24 |
| Concentrate of dispersed calcium carbonate of Example I | 34.00 |

Reference oil A

| | Percent w. |
|---|---:|
| Base oil (residual naphthenic lubricating oil with a viscosity at 98.9° C. of 16.12 cs.) | 66 |
| Concentrate of dispersed calcium carbonate of Example I | 34 |

Reference oil B

| | |
|---|---:|
| Base oil (naphthenic lubricating oil distillate of Example I) | 78 |
| Polyisobutylene mol. wt. Mn 830 | 22 |

Reference oil C

| | |
|---|---:|
| Base oil of reference oil B | 98 |
| Polyisobutylene mol. wt. Mn 15,000 | 2 |

Reference oil D

| | |
|---|---:|
| Residual naphthenic lubricating oil with a viscosity at 98.9° C. of 17.3 cs. | 100 |

The oils were tested in a Bolnes IL 190 diesel engine, a Sulzer IT 48 diesel engine and a Werkspoor DM-1 engine. The Bolnes IL 190 engine is a single-cylinder two-stroke engine with longitudinal scavenging, bore x piston displacement 190 x 350 mm. The duration of the test was 100 hours at 50 HP load and 430 r.p.m.

The Sulzer IT 48 engine is a single-cylinder two-stroke engine with cross scavenging, bore x piston displacement 480 x 700 mm. The duration of the test was 72 hours or 396 hours, at 262 HP or 350 HP load, as stated further below. The speed was always 250 r.p.m.

The Werkspoor DR-1 engine is a single-cylinder four-stroke engine, bore x piston displacement 320 x 450 mm. The duration of the test was 13 hours at 50 HP load and 250 r.p.m.

In the three engines cylinder lubrication and crankshaft lubrication are separate. The cylinders are lubricated with the oils mentioned hereinbefore. The fuel was a residual fuel with a sulphur content of 3.5%.

TABLE I.—BOLNES 100-HOUR TESTS

| Test oil: | Total ring wear during test, g. |
|---|---:|
| Oil of Example I | 2.47 |
| Oil of Example II | 2.38 |
| Oil of Example III | 2.23 |
| Oil of Example IV | 2.43 |
| Reference oil A | 3.12 |
| Reference oil B | 5.33 |
| Reference oil C | 7.98 |
| Reference oil D | 5.34 |

As appears from these results, the oils according to Examples I–IV have a better anti-wear effect than the reference oils. The synergistic effect of the combination of the dispersion and the polymer shows up on comparison of the results obtained with the oils according to Examples I–IV with those obtained with the reference oils, of which oil A only contains the dispersion as an additive, B and C only a polymer, and D is a plain oil.

The results of the 72-hour Sulzer tests are stated in Table II.

TABLE II.—72-HOUR SULZER TESTS

| Test oil | Load, HP | Total ring wear during test, g. |
|---|---:|---:|
| Oil of Example I | 262 | 1.95 |
| Oil of Example II | 350 | 6.60 |
| Oil of Example III | 350 | 4.55 |
| Oil of Example IV | 350 | 5.45 |
| Oil of Example VII | 350 | 5.50 |
| Reference oil A | 350 | 8.60 |

The results of these tests were further confirmed by 396-hour tests, in which the load was always 262 HP.

TABLE III.—396-HOUR SULZER TESTS, LOAD 262 HP

| Test oil: | Total ring wear during test, g. |
|---|---:|
| Oil of Example II | 6.70 |
| Reference oil A | 12.45 |

These examples show the beneficial anti-wear effect of an oil according to the invention as compared with that of a reference oil with the same metal content and viscosity as the oil according to the invention.

The results of the 13-hour Werkspoor tests are stated in the following Table IV.

TABLE IV.—13-HOUR WERKSPOOR TESTS

| Test oil: | Iron content of cylinder drip oil, percent |
|---|---:|
| Oil of Example III | 0.023 |
| Oil of Example V | 0.030 |
| Oil of Example VI | 0.029 |
| Oil of Example VII | 0.018 |
| Oil of Example VIII | 0.025 |
| Oil of Example IX | 0.028 |
| Oil of Example X | 0.025 |
| Oil of Example XI | 0.030 |
| Reference oil A | 0.034 |

These examples show the favorable anti-wear effect of an oil according to the invention, compared with that of a reference oil with the same metal content and viscosity as the oil according to the invention.

What we claim is:

1. A process for lubricating the cylinder wall of diesel engines operating on high sulfur fuel and having two separate lubricating systems comprising injecting onto the cylinder wall a once-through mineral lubricating oil composition comprising a major amount of mineral lubricating oil distillate fraction having a boiling point range of from 350 to 550° C. and a viscosity index above 30 and having incorporated therein from 0.01 to 0.5 equivalent of alkaline earth metal per 100 grams of lubricating oil of alkaline earth metal carbonate; from 0.05 to 0.5 equivalent of an oil-soluble alkaline earth metal salt selected from the group consisting of alkaline earth metal naphthenate and alkyl salicylate per equivalent of alkaline earth metal carbonate, and from 0.1 to 10% of an olefinic polymer selected from the group consisting of olefinic hydrocarbon polymer, $C_{4-18}$ alkyl methacrylate polymer, and vinyl ester of $C_{9-18}$ aliphatic monocarboxylic acid polymer, having a molecular weight of from 500 to 2,000,000.

2. A process for lubricating the cylinder wall and pistons of diesel engines operating on high sulfur fuel and having two separate lubricating systems, comprising injecting onto the cylinder wall a once-through mineral lubricating oil composition comprising a major amount of a naphthenic mineral oil distillate having a boiling point range of from 350 to 550° C. and a viscosity index of from 30 to 120 and having incorporated therein from 0.01 to 0.5 equivalent of alkaline earth metal per 100 grams of lubricating oil of an alkaline earth metal carbonate, from 0.05 to 0.5 equivalent of an alkaline earth metal naphthenate per equivalent of alkaline earth metal carbonate and from 0.1% to 10% of polyisobutylene having a molecular weight of from about 500 to about 30,000.

3. A process for lubricating the cylinder wall and pistons of diesel engines operating on high sulfur fuel and having two separate lubricating systems, comprising injecting onto the cylinder wall a once-through mineral lubricating oil composition comprising a major amount of a naphthenic mineral oil distillate having a boiling point range of from 350 to 550° C. and a viscosity index of from 30 to 120 and having incorporated therein from 0.01 to 0.5 equivalent of alkaline earth metal per 100 grams of lubricating oil of an alkaline earth metal carbonate, from 0.05 to 0.5 equivalent of an alkaline earth metal $C_{14-18}$ alkyl salicylate per equivalent of alkaline earth metal carbonate and from 0.1% to 10% of polyisobutylene having a molecular weight of from about 500 to about 30,000.

4. A process for lubricating the cylinder wall and pistons of diesel engines operating on high sulfur fuel and having two separate lubricating systems, comprising injecting onto the cylinder wall a once-through mineral lubricating oil composition comprising a major amount of a naphthenic mineral oil distillate having a boiling point range of from 350 to 550° C. and a viscosity index of from 30 to 120 and having incorporated therein from 0.01 to 0.5 equivalent of calcium per 100 grams of lubricating oil of calcium carbonate, from 0.05 to 0.5 equivalent of calcium naphthenate per equivalent of calcium carbonate and from 0.1 to 10% of polyisobutylene having a molecular weight of from about 500 to about 30,000.

5. A process for lubricating the cylinder wall and pistons of diesel engines operating on high sulfur fuel and having two separate lubricating systems, comprising injecting onto the cylinder wall a once-through mineral lubricating oil composition comprising a major amount of a naphthenic mineral oil distillate having a boiling point range of from 350 to 550° C. and a viscosity index of from 30 to 120 and having incorporated therein from 0.01 to 0.5 equivalent of calcium per 100 grams of lubricating oil of calcium carbonate, from 0.05 to 0.5 equivalent of calcium $C_{14-18}$ alkyl salicylate per equivalent of calcium carbonate and from 0.1 to 10% of polyisobutylene having a molecular weight of from about 500 to about 20,000.

References Cited

UNITED STATES PATENTS

| | | | |
|---|---|---|---|
| 2,227,690 | 1/1941 | Arveson | 252—59 |
| 2,282,599 | 5/1942 | Barnard | 252—59 X |
| 2,673,185 | 3/1954 | Bartlett | 252—56 |
| 2,676,925 | 4/1954 | Linstrom et al. | 252—18 |

FOREIGN PATENTS

| | | |
|---|---|---|
| 793,608 | 4/1958 | Great Britain. |
| 810,685 | 3/1959 | Great Britain. |

DANIEL E. WYMAN, *Primary Examiner.*

C. F. DEES, *Assistant Examiner.*